US012478233B2

(12) United States Patent
Sun et al.

(10) Patent No.: US 12,478,233 B2
(45) Date of Patent: Nov. 25, 2025

(54) NOZZLE PART AND ROBOT CLEANER INCLUDING SAME

(71) Applicant: LG ELECTRONICS INC., Seoul (KR)

(72) Inventors: Changhwa Sun, Seoul (KR); Seungyeop Lee, Seoul (KR); Sangchul Lee, Seoul (KR); Jungmin Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 545 days.

(21) Appl. No.: 18/017,247

(22) PCT Filed: Nov. 27, 2020

(86) PCT No.: PCT/KR2020/017082
§ 371 (c)(1),
(2) Date: Jan. 20, 2023

(87) PCT Pub. No.: WO2022/019395
PCT Pub. Date: Jan. 27, 2022

(65) Prior Publication Data

US 2023/0292968 A1 Sep. 21, 2023

(30) Foreign Application Priority Data

Jul. 23, 2020 (KR) ........................ 10-2020-0091870

(51) Int. Cl.
*A47L 9/04* (2006.01)
*B08B 1/40* (2024.01)

(52) U.S. Cl.
CPC ........... *A47L 9/0477* (2013.01); *A47L 9/0433* (2013.01); *A47L 9/0466* (2013.01); *B08B 1/40* (2024.01); *A47L 2201/00* (2013.01)

(58) Field of Classification Search
CPC ..... A47L 9/0477; A47L 9/0466; A47L 9/0433
See application file for complete search history.

(56) References Cited

U.S. PATENT DOCUMENTS 9,220,386 B2 12/2015 Gilbert et al.
2010/0287717 A1 11/2010 Jang et al.
(Continued)

FOREIGN PATENT DOCUMENTS

CN 109199228 1/2019
CN 210673225 6/2020
(Continued)

OTHER PUBLICATIONS

International Search Report dated Aug. 6, 2021 issued in Application No. PCT/KR2020/017082.
(Continued)

*Primary Examiner* — Bryan R Muller
(74) *Attorney, Agent, or Firm* — KED & ASSOCIATES, LLP

(57) ABSTRACT

A nozzle part and a robot cleaner including same are disclosed. A nozzle part according to various embodiments of the present invention comprises: a brush for collecting waste such as hair; and a removing member for removing the waste, such as hair, that is stuck to the brush. The removing member more quickly rotates than the brush in the same direction to remove the waste, such as hair, that is stuck to the brush. Therefore, the waste such as hair can be easily collected, removed and captured. Thus, user convenience can be improved.

12 Claims, 12 Drawing Sheets

(56) References Cited

U.S. PATENT DOCUMENTS

| | | | | |
|---|---|---|---|---|
| 2018/0184870 | A1 | 7/2018 | Moon et al. | |
| 2018/0338654 | A1 | 11/2018 | Kelsey | |
| 2020/0008641 | A1* | 1/2020 | Gunter | A47L 9/0477 |
| 2020/0288930 | A1* | 9/2020 | Wells | A47L 9/0613 |

FOREIGN PATENT DOCUMENTS

| | | | | | |
|---|---|---|---|---|---|
| CN | 210673225 | U | * | 6/2020 | |
| DE | 102016114236 | A1 | * | 2/2018 | A47L 9/0411 |
| JP | 2001-201656 | | | 7/2001 | |
| JP | 2001204656 | A | * | 7/2001 | |
| JP | 2006-136647 | | | 6/2006 | |
| JP | 2009-207646 | | | 9/2009 | |
| JP | 2010-142364 | | | 7/2010 | |
| JP | 2014-530727 | | | 11/2014 | |
| JP | 2015-156987 | | | 9/2015 | |
| JP | 2018-506414 | | | 3/2018 | |
| JP | 2019-136486 | | | 8/2019 | |
| KR | 10-2004-0052092 | | | 6/2004 | |
| KR | 10-2010-0093325 | | | 8/2010 | |
| KR | 10-2010-0123585 | | | 11/2010 | |
| KR | 10-2012-0115008 | | | 10/2012 | |
| KR | 10-1452617 | | | 10/2014 | |
| KR | 10-1476156 | | | 12/2014 | |
| KR | 10-1492069 | | | 2/2015 | |
| KR | 10-1514201 | | | 4/2015 | |
| KR | 10-2015-0075642 | | | 7/2015 | |
| KR | 10-2015-0134797 | | | 12/2015 | |
| KR | 10-2018-0079070 | | | 7/2018 | |
| KR | 10-2018-0085584 | | | 7/2018 | |
| KR | 10-1981827 | | | 5/2019 | |
| KR | 10-2019-0122191 | | | 10/2019 | |
| KR | 10-2020-0028580 | | | 3/2020 | |
| KR | 10-2020-0045606 | | | 5/2020 | |
| TW | 200610517 | | | 4/2006 | |
| TW | 201628545 | | | 8/2016 | |
| TW | 201711621 | | | 4/2017 | |
| TW | 201742588 | | | 12/2017 | |
| TW | 201806538 | | | 3/2018 | |

OTHER PUBLICATIONS

Taiwan Notice of Allowance dated Apr. 6, 2022 issued in Application No. 109143289.

International Search Report dated Apr. 22, 2021 issued in Application No. PCT/KR2021/000242.

Taiwanese Office Action dated Dec. 27, 2021 issued in Application No. 110106358.

International Search Report dated Mar. 18, 2021 issued in Application No. PCT/KR2020/017075.

Korean Office Action dated Jul. 26, 2021 issued in Application No. 10-2020-0091871.

Taiwan Office Action dated Dec. 27, 2021 issued in Application No. 109146057.

International Search Report dated Mar. 18, 2021 issued in Application No. PCT/KR2020/017729.

Korean Office Action dated Jul. 26, 2021 issued in Application No. 10-2020-0091868.

Taiwan Office Action dated Mar. 28, 2022 issued in Application No. 109143290.

* cited by examiner (a)

(b)

A-A'

NOZZLE PART AND ROBOT CLEANER INCLUDING SAME

CROSS-REFERENCE TO RELATED PATENT APPLICATIONS

This application is the National Stage filing under 35 U.S.C. 371 of International Application No. PCT/KR2020/017082, filed on Nov. 27, 2020, which claims the benefit of earlier filing date of and rights of priority to Korean Application 10-2020-0091870 filed on Jul. 23, 2020, the contents of which are all hereby incorporated by reference herein in their entirety.

TECHNICAL FIELD

The present disclosure relates to a nozzle part and a robot cleaner including the same, and more specifically, to a nozzle part having a structure capable of effectively collecting substances such as hair or fiber that is easily adhered but is not easily separated, and a robot cleaner including the same.

BACKGROUND ART

A robot cleaner refers to a device capable of independently performing a cleaning operation according to a preset method, without requiring a user's manual operation. The robot cleaner may have an operation time and an operation method set in advance.

The robot cleaner provides various conveniences such as that the user does not need to directly perform cleaning, and that the operation mode and operation time can be arbitrarily set. Accordingly, in recent years, the demand for a robot cleaner has been increased.

The robot cleaner drives indoors according to a preset method and sucks dust, small trash or the like existing on the floor. To this end, the robot cleaner includes a motor that forms suction power, a dust bin that stores sucked dust or small trash, and a filter that purifies and discharges air sucked in the dust bin.

The trash collected by the robot cleaner may have many forms. For example, the trash may include hair that has been removed from a human body, fiber strands separated from clothes, and the like.

With the trend of decreasing the number of members constituting households, such as single-person households, households with companion animals are increasing. In the above case, by the way, companion animals have more fur that falls out more easily than humans.

The above-described trash such as hair, fiber strands, or companion animal hair has a property of being easily adhered to an object having a rough surface by electrostatic attraction. At the same time, the trash has a property of not being easily separated from a surface of the adhered object.

Therefore, in everyday life, when the trash adheres to a surface of an object made of a fibrous material such as a carpet or a rug, it is not easy to separate it. Even when the trash is collected during housework or while the robot cleaner drives on a surface such as a carpet or a rug, it is difficult to separate the trash from the robot cleaner.

Accordingly, not only the user's convenience is deteriorated, but there is also a concern that the robot cleaner may malfunction or be damaged by the trash adhered to the robot cleaner.

Korean Patent No. 10-1981827 discloses a cleaning device for a nozzle of a vacuum cleaner. More specifically, it discloses a cleaning device for a nozzle of a vacuum cleaner including a socket for accommodating a vacuum cleaner nozzle, and a cleaning member disposed in the socket to remove articles entangled therewith while a rotatable member rotates.

However, the cleaning device for the nozzle of this type of vacuum cleaner is disposed in a charging stand for charging the vacuum cleaner. Accordingly, there is an inconvenience in that the user must place the vacuum cleaner on the charging stand and then operate the vacuum cleaner again after completing the use of the vacuum cleaner.

Korean Patent Publication No. 10-2020-0028580 discloses a pet comb capable of sucking and removing hair and a vacuum cleaner including the same.

Specifically, it discloses a pet comb including a roll comb part that combs the fur of a pet inside a body case and a rake part that removes fur stuck in the roll comb portion and a vacuum cleaner including the same.

However, this type of pet comb and a vacuum cleaner including the same have a limitation in that they are applicable only to a handy type cleaner other than a robot cleaner or a large cleaner due to their use.

In addition, since both the roll comb part and the rake part are provided in a rake shape, there is also a limitation that it is difficult to remove hair tangled in each rake.

Korean Patent No. 10-1981827 (May 23, 2019)

Korean Patent Publication No. 10-2020-0028580 (Mar. 17, 2020)

DISCLOSURE OF INVENTION

Technical Problem

An aspect of the present disclosure is to provide a nozzle part having a structure capable of solving the foregoing problems, and a robot cleaner including the same.

First, an aspect of the present disclosure is to provide a nozzle part having a structure capable of easily collecting trash in the form of hair or fiber scattered indoors, and a robot cleaner including the same.

Furthermore, an aspect of the present disclosure is to provide a nozzle part having a structure capable of easily capturing the collected trash in the form of hair or fiber, and a robot cleaner including the same.

In addition, an aspect of the present disclosure is to provide a nozzle part having a structure capable of easily discharging the trash in the form of hair or fiber, and a robot cleaner including the same.

Moreover, an aspect of the present disclosure is to provide a nozzle part and a robot cleaner having a structure capable of minimizing the number of components that provide power to a member for achieving the above object.

Besides, an aspect of the present disclosure is to provide a nozzle part having a structure capable of simplifying the structure of the member for achieving the above object, and a robot cleaner including the same.

Moreover, an aspect of the present disclosure is to provide a nozzle part having a structure that is applicable to other types of robot cleaners as well as achieving the above object, and a robot cleaner including the same.

Solution to Problem

In order to achieve the foregoing objectives, the present disclosure provides a nozzle part, including a frame; a brush rotatably coupled to the frame to extend in one direction; and a removal member located adjacent to the brush to extend in said one direction, and rotatably coupled to the frame with respect to the brush, wherein the removal member includes an extension part extending along said one direction, and located adjacent to an outer circumference of the brush to partially cover the outer circumference of the brush; and a support part located at each end portion in a direction in which the extension part extends, and rotatably coupled to the frame.

Furthermore, the brush and the removal member of the nozzle part may be rotated in the same direction, and the removal member may be rotated at a faster speed than the brush.

Furthermore, the brush of the nozzle part may be located therein to rotate about an arbitrary axis extending in said one direction, and the removal member may revolve with respect to the brush at a radial outer side of the brush about the arbitrary axis.

Furthermore, the extension part of the nozzle part may have a cross section centered on the arbitrary axis, and have an arc shape having the same curvature as the outer circumference of the brush.

Furthermore, a plurality of the extension parts may be provided in the nozzle part, and the plurality of extension parts may be arranged to be spaced apart from each other in a circumferential direction of the brush at a radial outer side of the brush.

Furthermore, the plurality of the extension parts of the nozzle part may be arranged to face each other with the brush interposed therebetween.

Furthermore, the extension part of the nozzle part may be disposed to have a predetermined width in a direction different from said one direction, and the width of the extension part may be defined to be less than ¼ of a length in the other direction of the outer circumference of the brush.

Furthermore, the support part of the nozzle part may include a hollow disposed to pass therethrough therein in said one direction, to which the brush is coupled to pass therethrough, and an inner circumference of the support part surrounding the hollow may be disposed to have a circular cross section.

Furthermore, the inner circumference of the support part of the nozzle part may be spaced apart from the outer circumference of the brush.

Furthermore, the nozzle part may include a main gear coupled to the brush to rotate together with the brush; and a sub-gear gear-coupled to the main gear, wherein the removal member includes a teeth part disposed on the inner circumference of the support part, and gear-coupled to the sub-gear.

Furthermore, the sub-gear may include a first sub-gear located biased to the main gear, and gear-coupled to the main gear; and a second sub-gear located between the first sub-gear and the teeth part, and gear-coupled to the first sub-gear and the teeth part, respectively.

In addition, the present disclosure provides a robot cleaner, including a body part; a dust bin detachably coupled to the body part, and defined with a space therein; a nozzle housing detachably coupled to the body part, an inner space of which communicates with the space of the dust bin; and a nozzle part rotatably accommodated in the nozzle housing, and partially exposed to an outside of the nozzle housing, wherein the nozzle part includes a frame coupled to the nozzle housing; a brush rotatably coupled to the frame, and disposed to have a circular cross section to extend in one direction, and partially exposed to an outside of the nozzle housing; and a removal member located adjacent to the brush to extend in said one direction, and rotatably coupled to the frame with respect to the brush at a radial outer side of the brush, and the removal member includes an extension part extending along said one direction, and located adjacent to an outer circumference of the brush to partially cover the outer circumference of the brush; and a support part located at each end portion in a direction in which the extension part extends, and rotatably coupled to the frame.

Furthermore, the cross section of the extension part of the robot cleaner may have an arc shape whose center is the same as the center of the brush, defined with the same curvature as the outer circumference of the brush, and having a central angle of an acute angle, and a plurality of the extension parts may be provided, and the plurality of extension parts may be arranged to be spaced apart from each other in a circumferential direction of the brush at a radial outer side of the brush.

Furthermore, a hollow disposed to pass through the support part of the robot cleaner in said one direction, to which the brush is coupled to pass therethrough, may be provided therein, and a teeth part including a plurality of convex portions and concave portions may be disposed on an inner circumference of the support part surrounding the hollow, and the removal member may include a gear part coupled to the brush, and gear-coupled to the teeth part.

Furthermore, the gear part of the robot cleaner may include a main gear coupled to the brush to rotate together with the brush; a first sub-gear located biased to the main gear, and gear-coupled to the main gear; and a second sub-gear located between the first sub-gear and the teeth part, and gear-coupled to the first sub-gear and the teeth part, respectively, and the main gear, the second sub-gear, and the removal member are rotated in the same direction.

Advantageous Effects of Invention

According to an embodiment of the present disclosure, the following effects may be achieved.

First, a brush is provided in a nozzle part. The brush is extended in one direction, and an adhesive member formed of a material such as felt having a high roughness is provided on an outer circumference thereof. In other words, the adhesive member constitutes an outer circumferential surface of the brush. The brush is partially exposed to an outside of a nozzle housing.

When the robot cleaner is operated, the adhesive member rolls along a floor surface to be cleaned. Due to the material of the adhesive member and the characteristics of its shape, trash such as fur staying on the floor surface is easily adhered to the adhesive member.

Accordingly, trash such as fur existing in a region where the robot cleaner has passed while being driven may be easily collected.

Furthermore, a removal member is provided in the nozzle part. The removal member is positioned adjacent to the brush and revolves with respect to the brush. At this time, the removal member is rotated in the same direction as the brush at a higher speed than the brush. In other words, the brush rotates, and the removal member revolves at a radial outer side of the brush.

The removal member is disposed to partially surround an outer circumference of the brush. At this time, the removal member may be located to be spaced apart from an outer circumference of the brush by a predetermined distance. Trash such as fur adhered to an outer circumference of the brush, that is, the adhesive member, passes through a space generated by the separation and then is pressed by the removal member. Accordingly, trash such as fur adhered to the adhesive member may be dropped into an inner space of the nozzle housing in which the brush is accommodated.

Accordingly, the collected trash such as fur may be easily collected in a dust bin through an inner space of the nozzle housing and body part without any additional operation.

Furthermore, the dust bin is detachably coupled to the body part. An inner space of the dust bin communicates with an inner space of the body part. Through the foregoing process, trash such as fur scattered on the floor surface is collected and then moved and accommodated in the dust bin.

Accordingly, a user may separate only the dust bin to easily discharge the collected trash such as fur.

In addition, a main gear and a sub-gear are coupled to the brush. The main gear is gear-coupled to the power part and the sub-gear. The sub-gear is gear-coupled to a teeth part disposed on an inner circumference of the main gear and the support part.

When a power part is operated, the brush and the main gear rotate together. In addition, the sub-gear gear-coupled to the main gear and the removal member disposed with the teeth part are also rotated. At this time, since the teeth part is disposed on an inner circumference of the support part, it may be rotated in the same direction as the sub-gear gear-coupled thereto.

Therefore, when the brush is rotated by a single power part, the removal member may also be rotated by various couplings. As a result, the number of power sources required to rotate the brush and the removal member may be minimized.

Moreover, through the foregoing configuration, the brush and the removal member may be rotated simultaneously by a single power part. Accordingly, the configuration of the nozzle part may be defined simply.

In addition, the nozzle housing accommodating the nozzle part is detachably coupled to the body part. Therefore, the foregoing effects may be achieved only by separating the nozzle housing from the body part and coupling it to the body part of another robot cleaner.

Accordingly, the versatility of the nozzle part may be improved. In addition, the user may purchase only the nozzle part separately without purchasing an entire robot cleaner to use it for the robot cleaner previously used. As a result, user convenience and economy may be improved.

MODE FOR THE INVENTION

Hereinafter, a nozzle part according to an embodiment of the present disclosure and a robot cleaner including the same will be described in detail with reference to the accompanying drawings.

In the following description, the description of some components may be omitted to clarify the features of the present disclosure.

1. Definition of Terms

In case where an element is "connected" or "linked" to the other element, it may be directly connected or linked to the other element, but it should be understood that any other element may be existed therebetween.

On the contrary, in case where an element is "directly connected" or "directly linked" to the other element, it should be understood that any other element is not existed therebetween.

Unless clearly used otherwise, a singular expression used in the present disclosure may include a plural expression.

The term "dust" used in the following description refers to fine-sized particles, dust, etc. existing in an environment such as indoors where a robot cleaner is operated.

The term "small trash" used in the following description refers to trash of a size that is larger than dust but can be collected by the robot cleaner.

The term "fur" used in the following description refers to a fine thread-like material that has been removed from animals, including humans. The fur may be body hair that has been removed from a human body, hair on the head, or body hair that has been removed from an animal body.

The term "fiber" used in the following description refers to any fine thread-like material except for the fur. In one embodiment, the fiber may be a material that has been removed from clothing, bedding, furniture, and miscellaneous goods.

In the following description, hair and fiber are collectively referred to as "fur (F) or the like."

Figure 1:
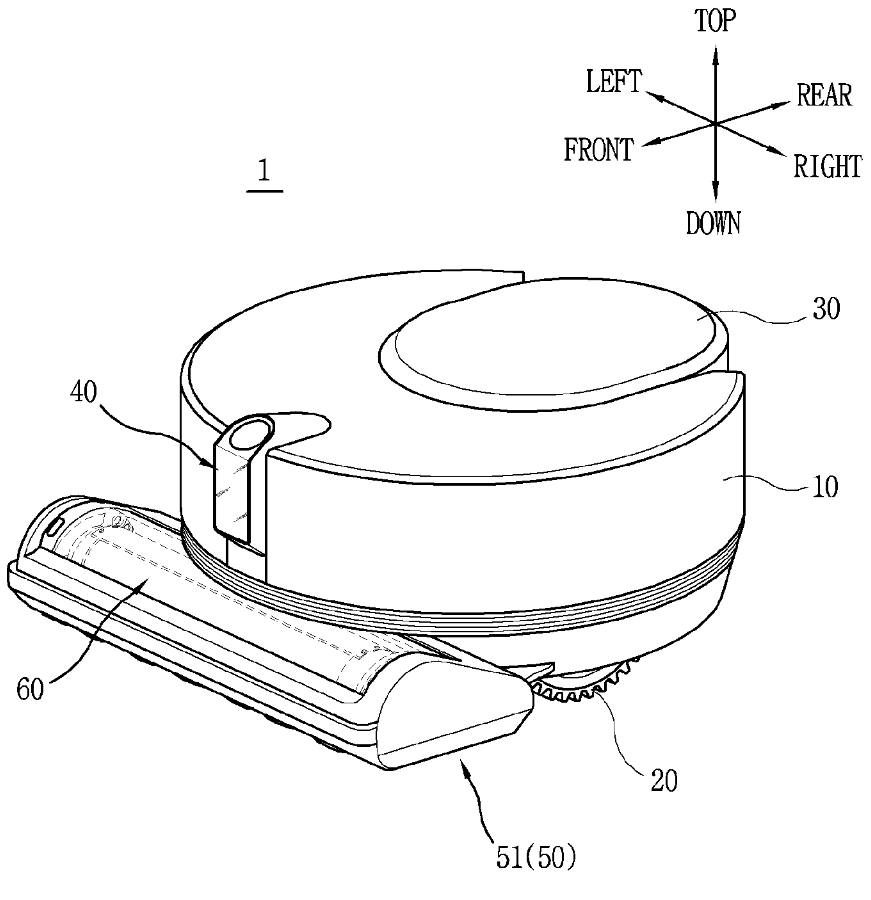
FIG. 1 is a perspective view illustrating a robot cleaner according to an embodiment of the present disclosure.

The terms "front side", "rear side", "left side", "right side", "top side" and "bottom side" used in the following description will be understood with reference to a coordinate system illustrated in FIG. 1.

Figure 2:
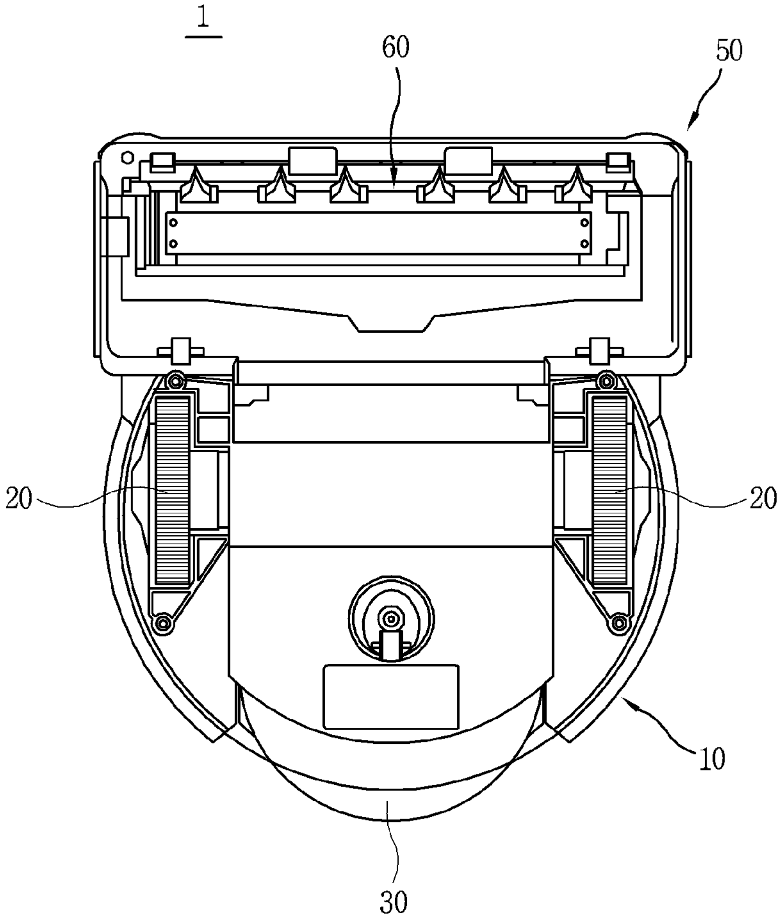
FIG. 2 is a bottom view illustrating the robot cleaner of FIG. 1.
Figure 3:
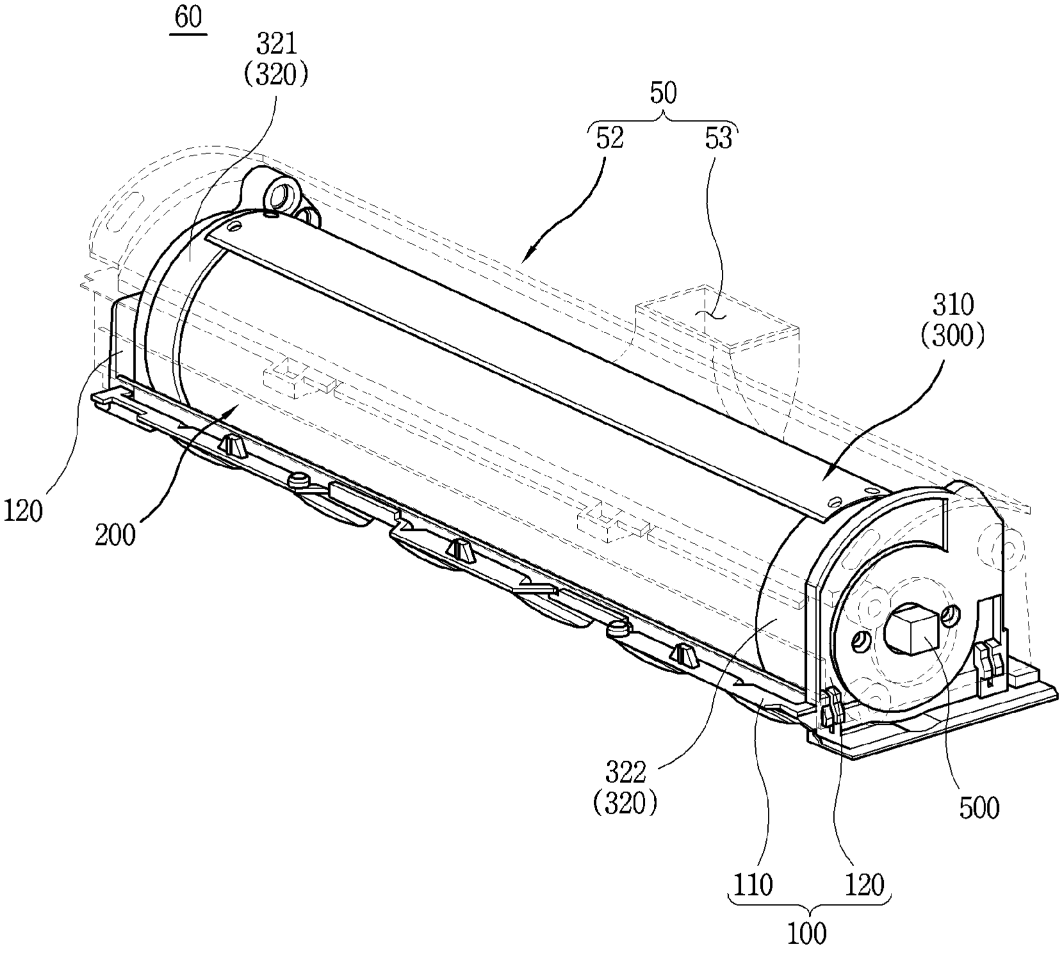
FIG. 3 is a perspective view illustrating a nozzle housing provided in the robot cleaner of FIG. 1.
Figure 4:
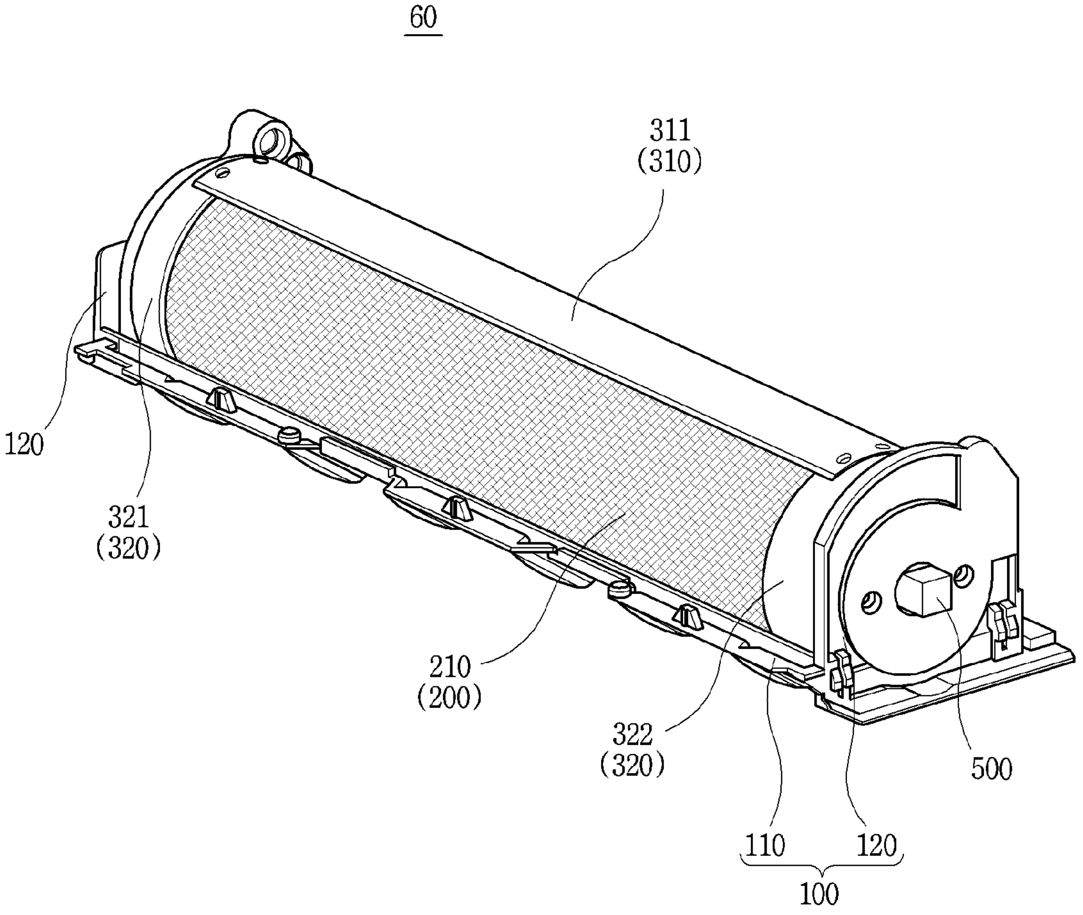
FIG. 4 is a perspective view illustrating a nozzle part according to an embodiment of the present disclosure that is accommodated in the nozzle housing of FIG. 3.
Figure 5:
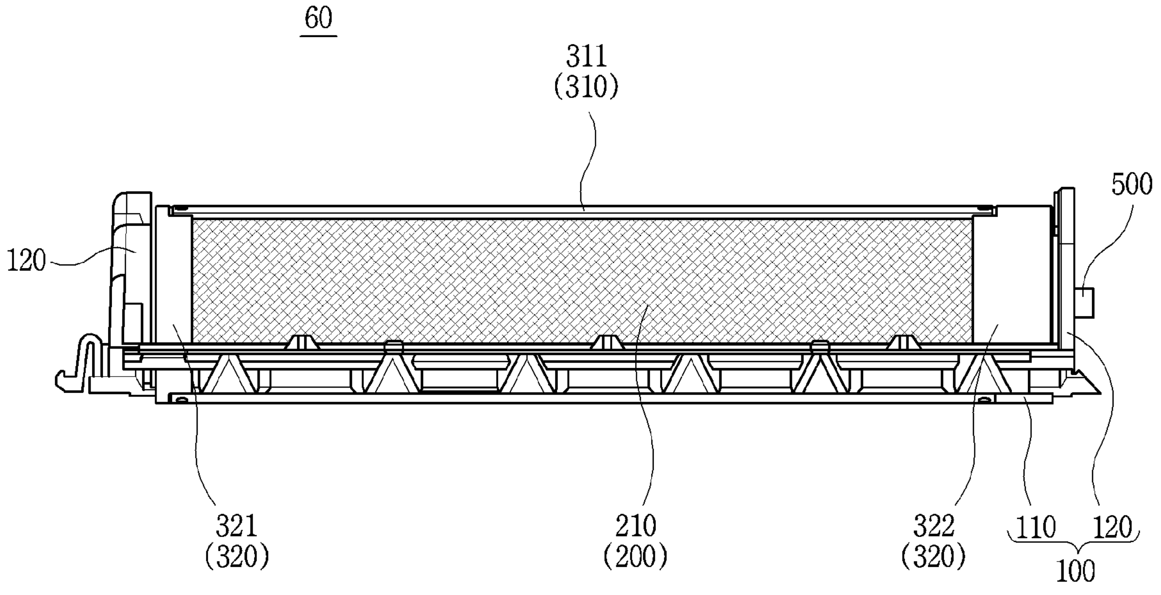
FIG. 5 is a front view illustrating the nozzle part of FIG. 4.
Figure 6:
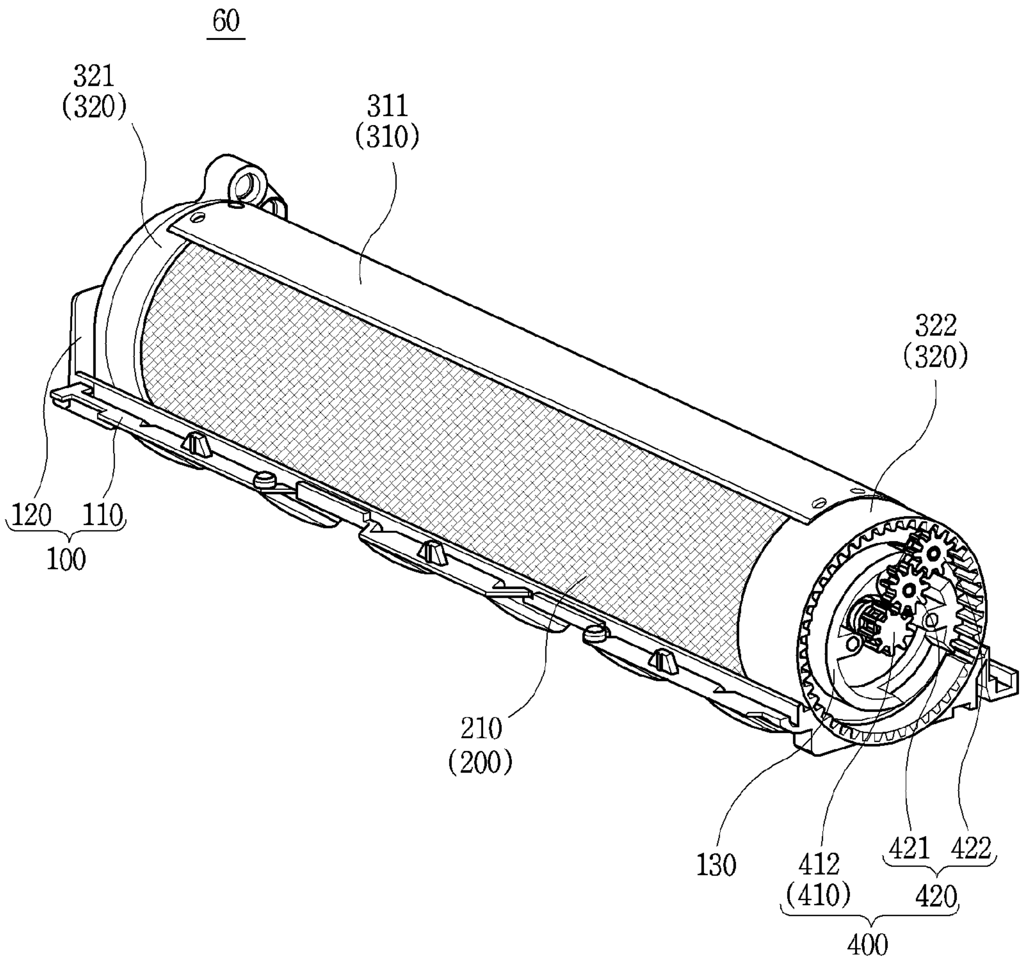
FIG. 6 is a perspective view illustrating the nozzle part of FIG. 4.

2. Description of Configuration of Robot Cleaner 1 According to Embodiment of Present Disclosure Referring to FIGS. 1 and 2, a robot cleaner 1 according to an embodiment of the present disclosure includes a body part 10, a driving part 20, a dust bin 30, a sensor part 40, a nozzle housing 50, and a nozzle part 60.

Hereinafter, each configuration of the robot cleaner 1 according to an embodiment of the present disclosure will be described with reference to the accompanying drawings, but the nozzle part 60 will be described as a separate paragraph.

(1) Description of Body Part 10

The body part 10 forms an outer shape of the robot cleaner 1. The body part 10 may accommodate components for the robot cleaner 1 to perform a cleaning operation in a space accommodated therein.

The body part 10 may collide with various obstacles provided in a region where the robot cleaner 1 is driven, for example, indoors. Therefore, the body part 10 is preferably formed of a material of high rigidity to prevent damage due to a collision.

In addition, the body part 10 is preferably formed of a lightweight material. This is to reduce power required for the driving of the robot cleaner 1.

In one embodiment, the body part 10 may be formed of a synthetic resin such as reinforced plastic.

A user interface may be provided outside the body part 10. The user may manipulate the user interface to control the operation of the robot cleaner 1. Furthermore, the user interface may display information on the robot cleaner 1 and the state of a region where the robot cleaner 1 is driven.

An inner space of the body part 10 may communicate with the outside. Air or small trash collected while the robot cleaner 1 is driven may flow into the dust bin 30 that is detachably coupled through an inner space of the body part 10. In addition, air introduced together with dust or small trash may be discharged to an outside of the body part 10.

Various sensors may be provided in the body part 10. In other words, in addition to the sensor part 40 which will be described later, the body part 10 may be provided with a gyro sensor or the like for sensing an inclination of the floor surface (G).

In the illustrated embodiment, the body part 10 has a circular cross section, and is provided in a disk shape having a predetermined height in a vertical direction. Accordingly, when the robot cleaner 1 collides with various obstacles while being driven, the body part 10 may rotate and drive in various directions.

A nozzle housing 50 and a nozzle part 60 accommodated in the nozzle housing 50 are detachably coupled to the body part 10. An inner space of the nozzle housing 50 may communicate with an inner space of the body part 10 and the dust bin 30.

Accordingly, trash (H) such as fur collected by the nozzle part 60 may be introduced and collected in the dust bin 30 through an inner space of the body part 10.

The driving part 20 is rotatably coupled to a lower side of the body part 10.

The driving part 20 provides power for moving the robot cleaner 1. In addition, the driving part 20 allows the robot cleaner 1 to be rotated to change the driving direction.

The driving part 20 is located at a lower side of the robot cleaner 1. The driving part 20 is rotatably coupled to a lower side of the body part 10.

The driving part 20 may be provided in a form capable of being rotated to move forward or backward. In the illustrated embodiment, the driving part 20 is provided in the form of a wheel.

A plurality of driving parts 20 may be provided. In the illustrated embodiment, the driving part 20 is provided on the left and right sides, respectively, at a lower side of the body part 10. The rotational speed and rotation direction of each driving part 20 positioned on each side may be controlled independently of each other.

Accordingly, the robot cleaner 1 may move forward, backward, rotate left or right.

Although not shown, the driving part 20 may be coupled to a power device (not shown). The power device (not shown) may be provided in the form of a motor that rotates the driving part 20 by receiving an electric signal.

In one embodiment, a plurality of power devices (not shown) may be provided, and coupled to a plurality of driving parts 20, respectively. Accordingly, the plurality of driving parts 20 may be controlled independently of each other.

The dust bin 30 stores the collected trash while the robot cleaner 1 is driven. In one embodiment, the dust bin 30 may accommodate trash (H) such as fur.

A predetermined space is defined inside the dust bin 30. The space communicates with a space disposed inside the body part 10. The trash collected through the nozzle part 60 may pass through the space disposed inside the body part 10 to enter an inside of the dust bin 30.

The dust bin 30 is detachably coupled to the body part 10. The user may release the dust bin 30 from the body part 10 to easily remove trash accommodated in the dust bin 30.

The dust bin 30 may be formed of a transparent material. This is to allow the user to visually recognize an amount of trash accommodated in the dust bin 30 and easily determine the discharge timing of trash.

Alternatively, a sensor (not shown) may be provided in the dust bin 30. In one embodiment, the sensor (not shown) may sense the mass or volume of trash accommodated in an inner space of the dust bin 30. The sensed mass or volume may be transmitted to the user in the form of visualization information or auditory information to allow the user to easily recognize the discharge timing of trash.

The sensor part 40 senses information on a path on which the robot cleaner 1 is driven.

The sensor part 40 may be located in a direction in which the robot cleaner 1 is to be driven. In the illustrated embodiment, the sensor part 40 is located at a front side of the body part 10 to sense information about an environment at a front side of the robot cleaner 1.

The sensor part 40 may be provided in an arbitrary form capable of detecting information on the environment of a path on which the robot cleaner 1 is driven or to be driven. In the illustrated embodiment, the sensor part 40 is provided as a camera capable of sensing image information.

Although not shown, the sensor part 40 may further include an infrared sensor or the like for sensing a distance to an obstacle.

The nozzle housing 50 is detachably coupled to a lower side of the sensor part 40, that is, at a lower side of the front of the body part 10.

The nozzle housing 50 accommodates the nozzle part 60. As the robot cleaner 1 is driven, trash collected by the nozzle part 60, particularly, trash (H) such as fur may be introduced into a space inside the body part 10 and the dust bin 30 through the nozzle housing 50.

The nozzle housing 50 is located at a lower side of the front of the body part 10. When the driving part 20 is rotated, a lower side of the nozzle housing 50 may be in contact with the floor surface (G) or spaced apart by a predetermined distance to move together with the body part 10.

A space is defined inside the nozzle housing 50. The nozzle part 60 is accommodated in the space. As will be described later, the nozzle part 60 includes a frame 100, a brush 200 rotatably coupled to the frame 100, and a removal member 300. The brush 200 and the removal member 300 of the nozzle part 60 may be rotated in an inner space of the nozzle housing 50.

The nozzle housing 50 is detachably coupled to the body part 10. When the nozzle housing 50 and the body part 10 are coupled to each other, the inner space of the nozzle housing 50 communicates with the inner space of the body part 10. Accordingly, the inner space of the nozzle housing 50 may communicate with the dust container 30.

The nozzle housing 50 is coupled to the body part 10 and moved together, and may have any shape capable of accommodating the nozzle part 60 therein. In the illustrated embodiment, the nozzle housing 50 has a polygonal columnar shape that extends long in a left-right direction, and protrudes upward with different inclination angles in the front and rear directions.

The nozzle housing 50 may collide with various obstacles provided in a region where the robot cleaner 1 is driven, for example, indoors. It is because the nozzle housing 50 is coupled to the body part 10 to be exposed to an outside of the body part 10. Therefore, the nozzle housing 50 is preferably formed of a material of high rigidity to prevent damage due to a collision.

Furthermore, the nozzle housing 50 is preferably formed of a lightweight material. This is to reduce power required for the driving of the robot cleaner 1.

In one embodiment, the nozzle housing 50 may be formed of a synthetic resin such as reinforced plastic.

In the illustrated embodiment, the nozzle housing 50 includes an outer housing 51, an inner housing 52 and a communication part 53.

The outer housing 51 defines an outer side of the nozzle housing 50. The outer housing 51 is exposed to an outside of the nozzle housing 50.

A predetermined space is defined inside the outer housing 51. The inner housing 52 and the nozzle part 60 accommodated in the inner housing 52 are accommodated in the space. The space communicates with a space disposed inside the body part 10. The communication is achieved by the communication part 53.

The inner housing 52 is located inside the outer housing 51.

The inner housing 52 defines an inner side of the nozzle housing 50. The inner housing 52 is not exposed to the outside.

A space is defined inside the inner housing 52. The nozzle part 60 is accommodated in the space. The brush 200 and the removal member 300 of the nozzle part 60 may be rotated while being accommodated in the inner housing 52.

The nozzle part 52 may be coupled to the inner housing 60. Specifically, the frame 100 of the nozzle part 60 may be coupled to the inner housing 52.

An opening part is disposed at one side of the inner housing 52, at a lower side in the illustrated embodiment. The nozzle part 60 accommodated in the inner housing 52 may be exposed to an outer side of the inner housing 52 through the opening part. Accordingly, when the robot cleaner 1 is driven, various types of trash placed on the floor surface (G) may be collected by the nozzle part 60.

The space defined inside the inner housing 52 communicates with the communication part 53. Various types of trash collected by the nozzle part 60 may pass through the communication unit 53 to be introduced into the inner space of the body part 10 and the dust container 30.

The communication part 53 communicates an inner space of the outer housing 51 and an inner space of the inner housing 52 with an inner space of the body part 10.

The communication part 53 may be located in the outer housing 51. The communication part 53 is located on one side facing the body part 10, at upper side of the rear in the illustrated embodiment.

The communication part 53 may be detachably coupled to the body part 10. By the coupling, the nozzle housing 50 and the body part 10 may be detachably coupled to each other.

3. Description of Nozzle Part 60 According to Embodiment of Present Disclosure Referring back to FIGS. 1 and 2, the robot cleaner 1 according to an embodiment of the present disclosure includes a nozzle part 60.

The nozzle part 60 is rotated as the robot cleaner 1 is operated to collect various types of trash located on the floor surface (G) in a region where the nozzle part 60 is exposed.

The nozzle part 60 may be moved together as the robot cleaner 1 is moved. Accordingly, the nozzle part 60 may collect trash in various regions.

The nozzle part 60 may be accommodated in the nozzle housing 50, and exposed toward the floor surface (G). When the robot cleaner 1 is driven, the nozzle part 60 is driven while being in contact with the floor surface (G) or being separated by a predetermined distance.

The nozzle part 60 may be rotated. Accordingly, various types of trash located on the floor surface (G) may be collected by the nozzle part 60, and collected in the dust bin 30 through the nozzle housing 50.

In this specification, the description will be made on the premise that the nozzle part 60 is rotated to collect trash (H) such as fur.

(1) Description of Components of Nozzle Part 60

Hereinafter, components of the nozzle part 60 according to an embodiment of the present disclosure will be described in detail with reference to FIGS. 3 through 9.

In the illustrated embodiment, the nozzle part 60 includes a frame 100, a brush 200, a removal member 300, a gear part 400, and a power part 500.

The frame 100 is a portion in which the nozzle part 60 is coupled to the nozzle housing 50. In addition, the frame 100 rotatably supports the brush 200 and the removal member 300.

The frame 100 may be formed of a lightweight and high rigid material. In one embodiment, the frame 100 may be formed of a synthetic resin material such as reinforced plastic.

The frame 100 defines part of the outer shape of the nozzle part 60. In the illustrated embodiment, the frame 100 defines lower, left and right sides of the nozzle part 60.

In the illustrated embodiment, the frame 100 includes a lower frame 110, a side frame 120 and a support frame 130.

The lower frame 110 defines a lower side of the frame 100. The lower frame 110 partially surrounds a lower side of the brush 200.

The lower frame 110 may be defined in a shape corresponding to the shape of the brush 200. In the illustrated embodiment, the brush 200 has a cylindrical shape extending in a left-right direction, and the lower frame 110 may also be provided in a plate shape extending in a left-right direction.

An opening part is disposed inside the lower frame 110. The opening part may be disposed to pass through upper and lower portions of the lower frame 110. Part of the brush 200, in the illustrated embodiment, part of the lower side may be exposed to a lower side of the lower frame 110 through the opening part. Accordingly, the brush 200 may be exposed to an outside of the nozzle housing 50.

Side frames 120 are located at respective end portions in both directions in which the lower frame 110 extends, and at left and right end portions in the illustrated embodiment, respectively.

The side frames 120 define respective end portions in a length direction of the frame 100 and in a left-right direction in the illustrated embodiment. The side frames 120 are coupled to end portions in respective directions in which the brush 200 extends, and to the left and right end portions, respectively, in the illustrated embodiment.

Either one of the side frames 120, the side frame 120 located on the right side in the illustrated embodiment, may have a through hole formed in the length direction. A power part 500 for rotating the gear part 400 may be coupled to the through hole to pass therethrough.

The brush 200 and the removal member 300 are rotatably coupled to the side frame 120. In other words, the side frame 120 is not rotated irrespective of the rotation of the brush 200 and the removal member 300. The coupling may be achieved by coupling the support frame 130 to the side frame 120.

The side frame 120 may be defined in a shape corresponding to the shape of the inner space of the nozzle housing 50. In the illustrated embodiment, the side frame 120 is provided in a plate shape in which an upper end portion thereof is defined to be rounded in a convex manner toward the upper side.

The support frame 130 rotatably couples the brush 200 to the side frame 120.

A plurality of support frames 130 may be provided. The plurality of support frames 130 may be coupled to the brush 200 and each side frame 120 in a direction in which the brush 200 extends, and in a left-right direction in the illustrated embodiment. The support frame 130 is located between the brush 200 and the side frame 120.

The support frame 130 may be coupled to the brush 200. In the illustrated embodiment, the support frame 130 may be located in a direction in which the brush 200 extends, that is, at left and right end portions, respectively.

A through part is disposed in the center of the support frame 130. Through the through portion, the brush 200 and the power part 500 may be coupled to each other. Accordingly, when the power part 500 is operated, the brush 200 connected thereto is rotated, but the support frame 130 is not rotated.

The detailed description of the rotation process will be described later.

The brush 200 is rotated to collect various types of trash staying on the floor surface (G).

The brush 200 is rotatably coupled to the frame 100. Specifically, both end portions of the brush 200 are rotatably supported by a plurality of side frames 120. The coupling or support is achieved as described above by the support frame 130.

The brush 200 is disposed to extend in one direction. In the illustrated embodiment, the brush 200 is formed to extend in a left-right direction. It will be understood that the extension direction is the same as that of the nozzle housing 50.

Accordingly, when the robot cleaner 1 moves forward, an area that the brush 200 sweeps may increase. Accordingly, the cleaning efficiency of the robot cleaner 1 may be improved.

The brush 200 may have any shape that is rotatable between the side frames 120. In the illustrated embodiment, the brush 200 has a circular cross section and a cylindrical shape extending in a left-right direction.

In the above embodiment, even when the rotation of the brush 200 is advanced, a distance between the center of the cross section and the outer circumference of the brush 200 may be kept constant to perform an efficient cleaning operation.

Support frames 130 are rotatably coupled to respective end portions in a direction in which the brush 200 extends, at left and right end portions in the illustrated embodiment, respectively. The support frame 130 is fixedly coupled to the side frame 120 to support the brush 200 so as to be rotatable as described above.

The removal member 300 is located adjacent to an outer circumference of the brush 200. The brush 200 may be relatively rotated with respect to the removal member 300. Accordingly, trash (H) such as fur collected by the brush 200 may be separated, and the detailed description thereof will be described later.

A main gear 410 is located on an outer circumference of each end portion in a direction in which the brush 200 extends, and on an outer circumference of each of the left and right end portions in the illustrated embodiment. The main gears 410 are gear-coupled to sub-gears 420 located adjacent to an outer circumference of the brush 200, respectively.

Accordingly, when the power part 500 is operated to rotate the brush 200, the main gear 410, the sub-gear 420, and the removal part 300 connected thereto are rotated. As a result, the brush 200 and the removal member 300 may be operated by a single power part 500.

The brush 200 may be formed of a lightweight and high rigid material. In one embodiment, the brush 200 may be formed of a synthetic resin material such as reinforced plastic.

An adhesive member 210 is provided on an outer circumference of the brush 200.

The adhesive member 210 defines an outer circumferential surface of the brush 200. In other words, the adhesive member 210 is provided on the brush 200 to surround the outer circumferential surface of the brush 200.

The adhesive member 210 may be formed of a material having a predetermined roughness. This is to easily collect trash (H) such as fur staying on the floor surface (G) by frictional force and electrostatic attraction.

Furthermore, the adhesive member 210 may be formed of a material having a predetermined adhesive strength. This is to facilitate collection by pressing and adhering trash (H) such as fur staying on the floor surface (G).

In one embodiment, the adhesive member 210 may be formed of a fibrous material such as felt, blended fabric, linen, or bristle. Alternatively, the adhesive member 210 may be formed of a material such as rubber, latex, or acryl.

In this case, the roughness of a surface in a direction in which the adhesive member 210 is exposed to the outside, and in a direction toward a radial outer side with respect to the center of the brush 200 in the illustrated embodiment is preferably defined to be relatively higher.

As the brush 200 and the adhesive member 210 provided therein are rotated, trash (H) such as fur located on the floor surface (G) may adhere to the adhesive member 210. Trash (H) such as sticky fur may be rotated together with the brush 200 and the adhesive member 210, and then separated by the removal member 300. The detailed description thereof will be described later.

The removal member 300 separates trash adhered to the adhesive member 210 of the brush 200, particularly, trash (H), such as fur, from the adhesive member 210. The separated adhesive member 210 may be removed into the inside of the nozzle housing 50, and moved and collected into the dust bin 30 through the communication part 53.

The removal member 300 is located adjacent to the brush 200. Specifically, the removal bar 300 coupled to the brush 200 by passing therethrough in a direction in which the brush 200 extends, in a left-right direction in the illustrated embodiment.

The removal member 300 is disposed to partially surround the brush 200.

Specifically, the removal member 300 surrounds each end portion in the direction in which the brush 200 extends, in the left-right direction in the illustrated embodiment, from the outside. Furthermore, the removal member 300 partially surrounds part of an outer circumference of the brush 200.

The removal member 300 extends in a direction in which the brush 200 extends, in a left-right direction in the illustrated embodiment. In one embodiment, an extension length of the removal member 300 may be defined equal to that of the brush 200.

Inside the removal member 300, a hollow that extends in the above direction, that is, in the left-right direction in the illustrated embodiment is disposed. The hollow may be disposed to pass through the removal member 300 in an extension direction thereof.

The removal member 300 may be defined to have a circular cross section. In addition, the hollow disposed in the removal member 300 may also have a circular cross section.

Accordingly, the cross section of the removal member 300 is defined in a ring shape. At this time, an inner diameter of the cross-section of the removal member 300 is preferably defined to be greater than or equal to that of the brush 200.

The brush 200 is coupled to the hollow of the removal member 300 by passing therethrough. At this time, the removal member 300 and the brush 200 may be rotatably coupled to each other independently. Accordingly, the removal member 300 is to rotate at a different speed than the brush 200.

Both end portions of the removal member 300 in an extension direction thereof, respective end portions in a left-right direction in the illustrated embodiment, are rotatably supported by the side frame 120.

The removal member 300 may be formed of a lightweight and high rigid material. In one embodiment, the removal member 300 may be formed of a synthetic resin material such as reinforced plastic.

The removal member 300 may be relatively rotated with respect to the brush 200. In other words, the brush 200 is rotated using the power part 500 as a rotation shaft. The removal member 300 revolves at a radial outer side of the brush 200 using a central shaft of the brush 200 or the power part 500 as a rotation shaft.

In this case, the removal member 300 may be rotated in the same direction as the rotation direction of the brush 200 or in a different direction. When the removal member 300 is rotated in the same direction as the rotation direction of the brush 200, trash (H) such as fur adhered to the adhesive member 210 may be removed.

Furthermore, the rotation speed of the removal member 300 may be higher than that of the brush 200. Accordingly, the removal member 300 may quickly remove trash (H) such as fur collected by the brush 200 from a radially outer side of the brush 200.

Such a difference in speed is achieved by the gear part 400 which will be described later.

In the illustrated embodiment, the removal member 300 includes an extension part 310, a support part 320, and a teeth part 330.

The extension 310 is disposed to partially surround an outer circumference of the brush 200. In this case, the extension part 310 may be located adjacent to the outer circumference of the brush 200, but spaced apart from the outer circumference of the brush 200.

The extension part 310 is disposed to extend in a direction in which the brush 200 extends, in a left-right direction in the illustrated embodiment.

The extension part 310 may extend at the same length as that in which the brush 200 extends. In other words, both end portions of the extension part 310 in an extension direction thereof may be located to overlap with both end portions of the brush 200 in an extension direction thereof.

The extension part 310 may be coupled to the support part 320. Accordingly, when the teeth part 330 disposed inside the support part 320 is pressed by the gear part 400, the extension part 310 may be rotated together with the support part 320.

In the illustrated embodiment, the extension part 310 has a predetermined width (i.e., a length in a front-rear direction), and is provided in a curved shape extending in an extension direction thereof (i.e., a left-right direction). In this case, the extension part 310 may be disposed to have a circular arc cross section whose central axis is coaxial with that of the brush 200, and have the same curvature as the outer circumference of the brush 200.

In this case, the predetermined width of the extension part 310 is preferably disposed to be less than the length of the outer circumference of the brush 200. In the illustrated embodiment, the predetermined width of the extension part 310 is disposed to be less than ¼ of the length of the outer circumference of the brush 200.

As will be described below, a plurality of extension parts 310 may be provided. In this case, an area in which the outer circumference of the brush 200 is exposed may be disposed to be larger than that in which the plurality of extension parts 310 cover the outer circumference of the brush 200.

By the above structure, when the brush 200 collects trash (H) such as fur, interference due to the rotation of the removal member 300 may be minimized.

Alternatively, the extension part 310 may be provided in a bar shape. In the above embodiment, the effect of the extension part 310 on the rotation of the brush 200 may be minimized.

A plurality of extension parts 310 may be provided. The plurality of extension parts 310 are disposed to be spaced apart from each other along the outer circumference of the brush 200 to surround the outer circumference of the brush 200 at different positions.

In the illustrated embodiment, the extension part 310 includes a first extension part 311 located at one side of the brush 200 and a second extension part 312 located at the other side of the brush 200.

Furthermore, in the illustrated embodiment, the first extension part 311 and the second extension part 312 are disposed to face each other with the brush 200 interposed therebetween.

Alternatively, three or more extension parts 310 may be provided, and disposed along the outer circumference of the brush 200 so as to define the same angle with respect to the central axis of the brush 200.

Figure 7:
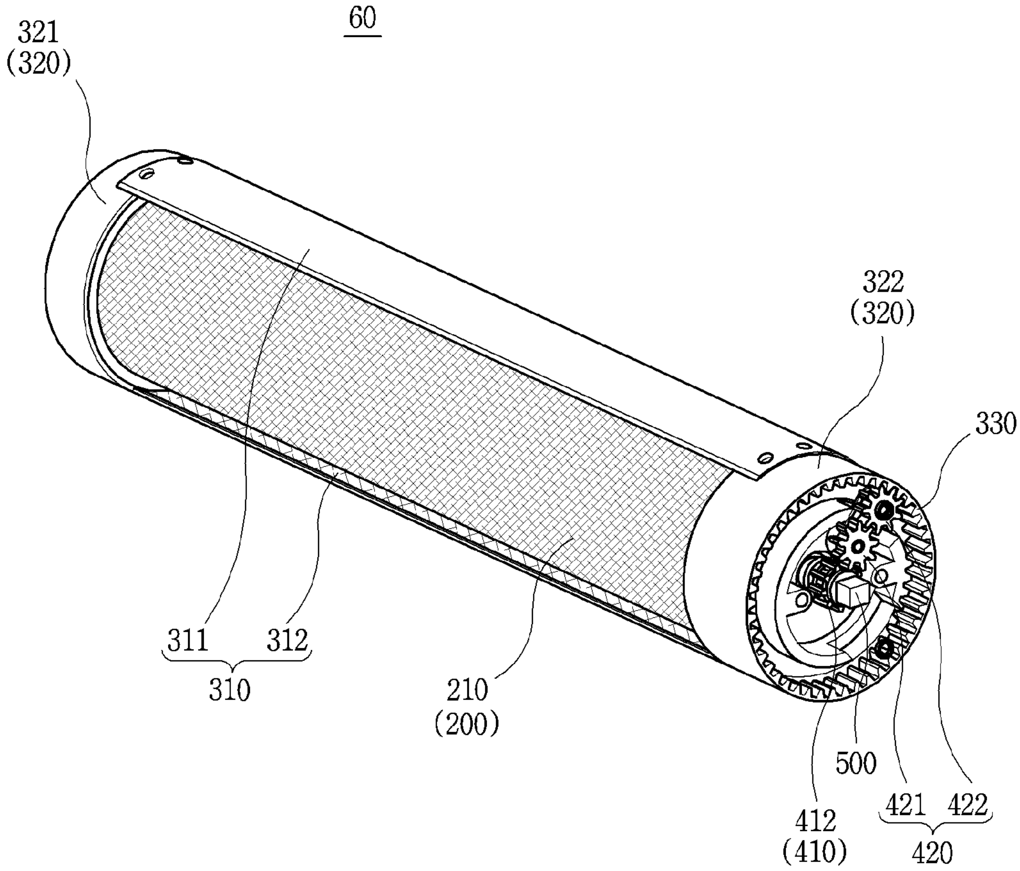
FIG. 7 is a perspective view illustrating the nozzle part of FIG. 4 from another angle.
Figure 8:
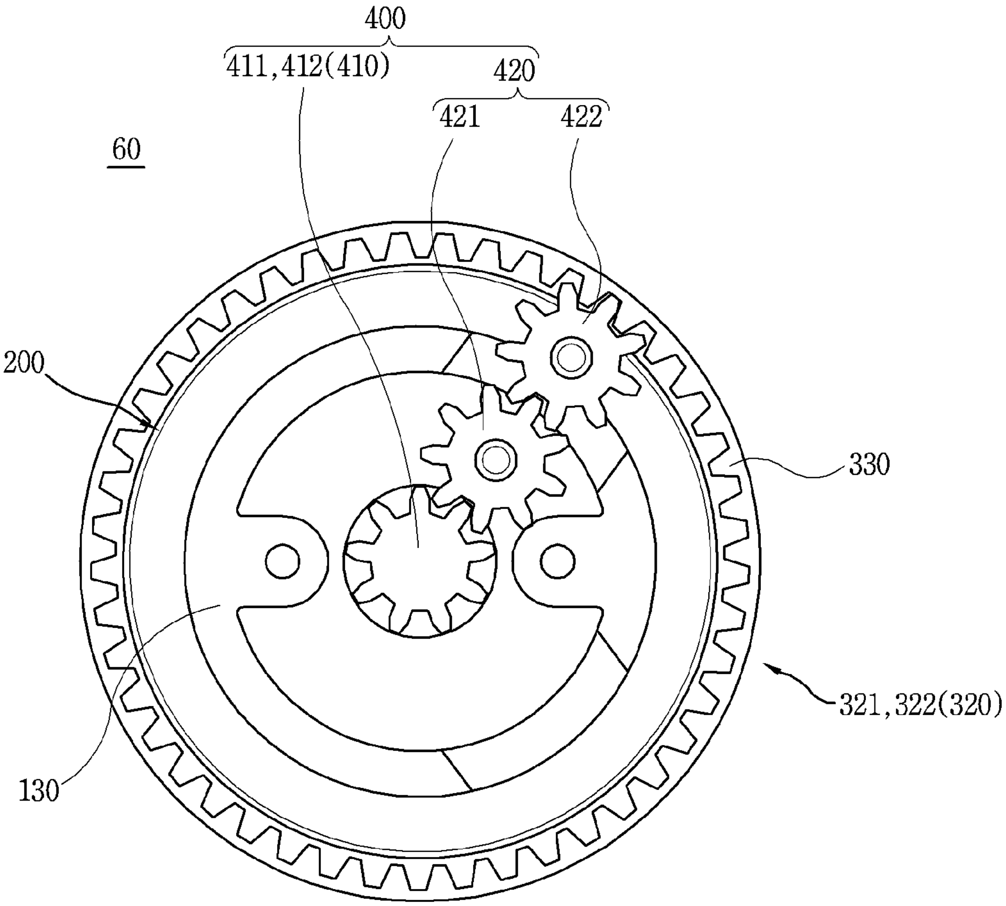
FIG. 8 is a side view illustrating the nozzle part of FIG. 4.
Figure 9:
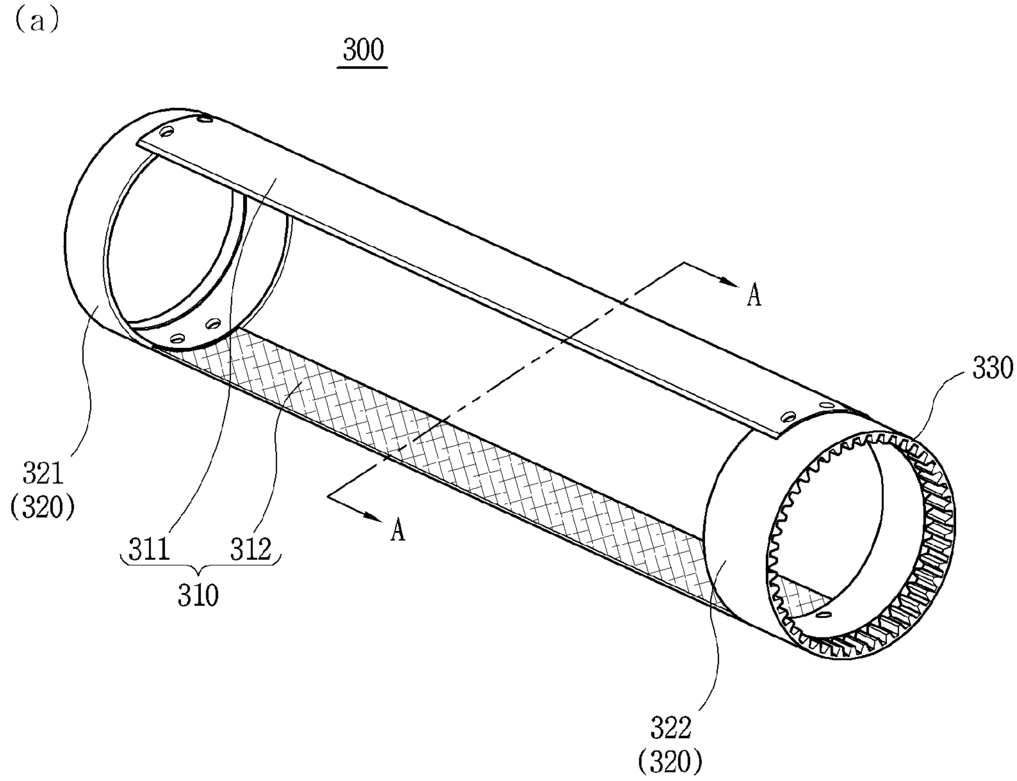
FIG. 9 is a perspective view illustrating a removal member provided in the nozzle part of FIG. 4.
Figure 9:
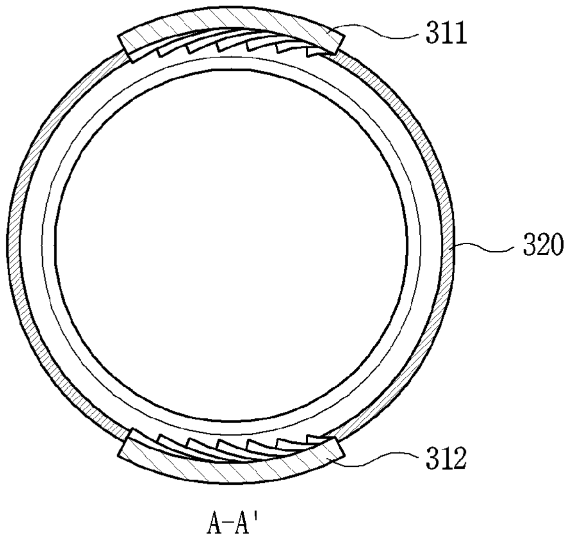

A member of the same material as that of the adhesive member 210 may be provided on a surface facing the brush 200 among the surfaces of respective extension parts 310, a surface facing a radial inner side in the illustrated embodiment (see FIGS. 7 and 9). The member may be in contact with and in friction against the adhesive member 210.

In other words, trash (H) such as fur adhered to the adhesive member 210 is easily separated from the adhesive member 210 by contact and friction between the member and the adhesive member 210 provided inside the extension part 310.

The support part 320 is located at an end portion of each direction in which the extension part 310 extends. Each end portion of the extension part 310 is coupled to the support part 320.

The support part 320 is a portion in which the removal member 300 is rotatably coupled to the frame 100. In addition, the support part 320 receives the rotation of the power part 500 to allow the removal member 300 to be independently rotated with respect to the brush 200.

The support part 320 is coupled to the extension part 310. Specifically, the support part 320 is coupled to the extension part 310 at an end portion in each direction in which the extension part 310 extends, and an end portion in a left-right direction in the illustrated embodiment. Accordingly, the support part 320 and the extension part 310 may be rotated together.

The support part 320 is disposed to have a circular cross section. A hollow having a circular cross section is disposed inside the support part 320. In other words, the support part 320 is disposed to pass therethrough in a left-right direction.

Accordingly, the support part 320 is defined in an annular cross section.

The brush 200 is coupled to the hollow of the support part 320 by passing therethrough. At this time, in order for the removal member 300 to rotate independently of the brush 200, an inner diameter of the cross section of the support part 320 is preferably disposed to be greater than an outer diameter of the brush 200.

More preferably, an inner circumference of the support part 320 is preferably spaced apart from an outer circumference of the brush 200.

The teeth part 330 is disposed on an inner circumference of the support part 320. The teeth part 330 may be integrally formed with the support part 320. Alternatively, the teeth part 330 may be disposed separately from the support part 320 to be coupled to an inner circumference of the support part 320. The support part 320 may be rotated integrally with the teeth part 330.

A plurality of support parts 320 may be provided. The plurality of support parts 320 may be coupled to the brush 200 and the extension part 310 at different positions.

In the illustrated embodiment, the support part 320 includes a first support part 321 coupled to the brush 200 and a left end portion of the extension part 310, respectively, and a second support part 322 coupled to the brush 200 and a right end portion of the extension part 310, respectively.

In the above embodiment, the first support part 321 is located at the brush 200 and the left end portion of the extension part 310. Furthermore, the second support part 322 is located at the brush 200 and the right end portion of the extension part 310.

The teeth parts 330 are respectively disposed on an inner circumference of each of the support parts 321, 322.

The teeth part 330 is gear-coupled to the gear part 400 to transmit a rotational force of the power part 500 to the removal extension part 310 and the support part 320. When the power part 500 is operated by the teeth part 330, the removal member 300 may be independently rotated with respect to the brush 200.

The teeth part 330 is coupled to the sub-gear 420 of the gear part 400. As will be described later, the sub-gear 420 includes a first sub-gear 421 that is gear-coupled to the main gear 410 and a second sub-gear 422 that is gear-coupled to the first sub-gear 421.

The teeth part 330 is gear-coupled to the second sub-gear 422. Accordingly, the rotational force of the power part 500 may be transmitted to the teeth part 330 through the main gear 410, the first sub-gear 421 and the second sub-gear 422.

The teeth part 330 is disposed on an inner circumference of the support part 320. As described above, the support part 320 has an inner circumference defined in a cylindrical shape. The teeth part 330 is continuous along the inner circumference of the support part 320. In other words, the teeth part 330 also has a cylindrical shape in its outer and inner circumferences.

The teeth part 330 includes a plurality of concave portions and convex portions. The plurality of concave portions and convex portions may be alternately continuous with each other along an inner circumference of the support part 320. The plurality of concave portions and convex portions may be gear-coupled to a plurality of convex portions and concave portions provided in the second sub-gear 422, respectively.

A plurality of teeth parts 330 may be provided. The plurality of teeth parts 330 may be respectively arranged on or coupled to inner circumferences of the plurality of support parts 320. In the illustrated embodiment, two teeth parts 330 are provided, and located on the inner circumferences of the first support part 321 and the second support part 322, respectively.

The detailed description of a process in which the power part 500 is rotated to rotate the removal member 300 will be described later.

The gear part 400 transmits the rotation of the power part 500 to the removal member 300. Accordingly, both the brush 200 and the removal member 300 may be rotated by a single power part 500. In addition, by the gear part 400, the brush 200 and the removal member 300 may be rotated at different speeds.

The gear part 400 is connected to the power part 500. When the power part 500 is operated, the gear part 400 may be rotated.

The gear part 400 is connected to the removal member 300. When the gear part 400 is rotated, the removal member 300 may also be rotated.

A plurality of gear parts 400 may be provided. In the illustrated embodiment, the gear unit 400 includes a main gear 410 coupled to the brush 200 to rotate together with the brush 200, and a sub-gear 420 located on an outer circumference of the main gear 410, and gear-coupled to the teeth part 330.

The main gear 410 is coupled to the brush 200. The main gear 410 may be rotated together with the brush 200. In the illustrated embodiment, the main gear 410 is accommodated inside both end portions of the brush 200.

The main gear 410 is coupled to the power part 500. The main gear 410 may be rotated together with the power part 500.

The main gear 410 is gear-coupled to the sub-gear 420. The rotation of the main gear 410 may be transmitted to the sub-gear 420.

A plurality of main gears 410 may be provided. The plurality of main gears 410 may be coupled to the brushes 200 at different positions in a direction in which the brush 200 extends, and rotated together with the brush 200.

In the illustrated embodiment, the main gear 410 includes a first main gear 411 located inside a left end portion of the brush 200 and a second main gear 412 locate inside a right end portion of the brush 200.

The main gear 410 may include a plurality of teeth parts. In other words, the main gear 410 may include a plurality of concave portions and a plurality of convex portions that are alternately arranged with each other along an outer circumference thereof.

The main gear 410 may be provided in any form capable of being gear-fitted to the sub-gear 420.

The sub-gear 420 is gear-coupled to the main gear 410. When the main gear 410 rotates, the sub-gear 420 gear-coupled to the main gear 410 also rotates. At this time, the sub gear 420 is rotated in an opposite direction to or in the same direction as the rotation direction of the main gear 410.

In addition, the sub-gear 420 is gear-coupled to the teeth part 330 of the removal member 300. Accordingly, the removal member 300 disposed with the teeth part 330 is rotated in the same direction as or in a different direction from the rotation direction of the sub-gear 420.

The sub-gear 420 may be provided in any form capable of being gear-coupled to the main gear 410 and teeth part 330, respectively.

A plurality of sub-gears 420 may be provided. The plurality of sub-gears 420 may be gear-coupled to the plurality of main gears 410 and teeth parts 330, respectively, at different positions in a direction in which the brush 200 extends from a radially outer side of the brush 200.

In the illustrated embodiment, the sub-gear 420 includes a first sub-gear 421 located biased to the main gear 410 and a second sub-gear 422 located biased to the teeth part 330.

The first sub-gear 421 is gear-coupled to the main gear 410 and the second sub-gear 422. The second sub-gear 422 is gear-coupled to the first sub-gear 421 and the teeth part 330.

Therefore, when the power part 500 is operated to rotate the main gear 410, the removal member 300 disposed with the first sub-gear 421, the second sub-gear 422 and the teeth part 330 will be rotated.

The sub-gear 420 may include a plurality of teeth parts. In other words, the sub-gear 420 may include a plurality of concave portions and a plurality of convex portions alternately arranged with each other along an outer circumference thereof.

At this time, the number of convex portions and concave portions respectively arranged on the main gear 410, the first sub-gear 421, the second sub-gear 422, and the teeth part 330 may be controlled to adjust a gear ratio thereof.

Through the above adjustment, the removal member 300 disposed with the teeth part 330 may be adjusted to rotate at a faster speed than the brush 200.

The power part 500 generates power for rotating the brush 200 and the removal member 300. The power part 500 is connected to the main gear 410 of the gear part 400. The power part 500 and the main gear 410 may rotate together.

The power part 500 may be provided in any form in which rotation or non-rotation thereof, a rotation direction, and a rotation speed, and the like can be controlled by an input of an electrical signal. In one embodiment, the power part 500 may be provided with an electric motor.

The power part 500 is electrically connected to an external power source (not shown) and a controller (not shown). Power for operating the power part 500 may be supplied from the power source (not shown). In addition, a control signal for controlling the rotation or non-rotation, the rotation direction, and the rotation speed, and the like of the power part 500 may be applied from the controller (not shown).

The power part 500 is connected to the brush 200. When the power part 500 is operated, the brush 200 may be rotated. Accordingly, the main gear 410 coupled to the brush 200 may also rotate.

The power part 500 may be located adjacent to either one of the first main gear 411 and the second main gear 412. In the illustrated embodiment, a singular number of the power part 500 is provided and located adjacent to the second main gear 412 located on the right side.

The power part 500 may be coupled to the side frame 120 of the frame 100. Accordingly, the power part 500 may be stably supported.

The detailed description of a process of rotating the brush 200 and the removal member 300 as the power part 500 is operated will be described later.

(2) Description of Operation Process of Nozzle Part 60

In the nozzle part 60 according to an embodiment of the present disclosure, the brush 200 and the removal member 300 may be rotated by a single number of the power part 500 through the foregoing configuration.

Hereinafter, an operation process of the nozzle part 60 according to an embodiment of the present disclosure will be described in detail with reference to FIGS. 10 and 11.

The power part 500 is electrically connected to a power source (not shown) and a controller (not shown) by a member such as an electric wire. When power and control signals are applied to the power part 500, the power part 500 is rotated.

The power part 500 is coupled to the brush 200. Therefore, when the power part 500 rotates, the brush 200 also rotates. At this time, the main gear 410 is coupled to each end portion in a direction in which the brush 200 extends, in a left-right direction in the illustrated embodiment. The main gear 410 is also rotated together with the brush 200.

The main gear 410 is gear-coupled to the first sub-gear 421 located adjacent thereto. Accordingly, when the main gear 410 rotates, the first sub-gear 421 also rotates. At this time, it will be understood that the rotation directions of the main gear 410 and the first sub-gear 421 are opposite to each other.

In addition, the first sub-gear 421 is gear-coupled to the second sub-gear 422 located adjacent thereto. Accordingly, when the first sub-gear 421 rotates, the second sub-gear 422 also rotates. At this time, it will be understood that the rotation directions of the first sub-gear 421 and the second sub-gear 422 are opposite to each other.

Moreover, the second sub-gear 422 is gear-coupled to the teeth part 330 located adjacent thereto. Accordingly, when the second sub-gear 422 is rotated, the teeth part 330 and the removal member 300 disposed with the teeth part 330 are also rotated. At this time, it will be understood that the rotation directions of the second sub-gear 422 and the removal member 300 are the same.

In other words, in summary, the main gear 410, the second sub-gear 422, and the removal member 300 are rotated in the same direction.

Figure 10:
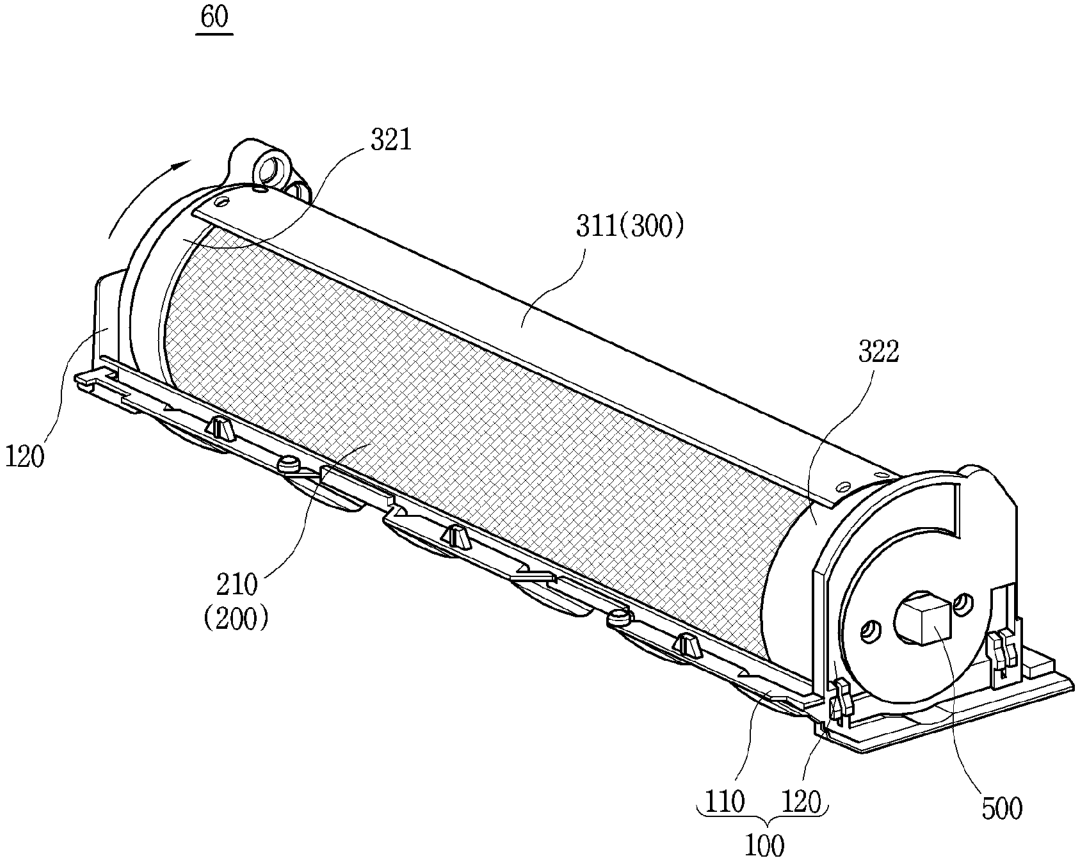
FIGS. 10 and 11 are perspective views illustrating an operation process of the nozzle part of FIG. 4.

Referring to FIG. 10, an embodiment in which the power part 500 is rotated in a clockwise direction is illustrated. In the above embodiment, the power part 500, the main gear 410, the second sub-gear 422, and the removal member 300 are also rotated in a clockwise direction.

Figure 11:
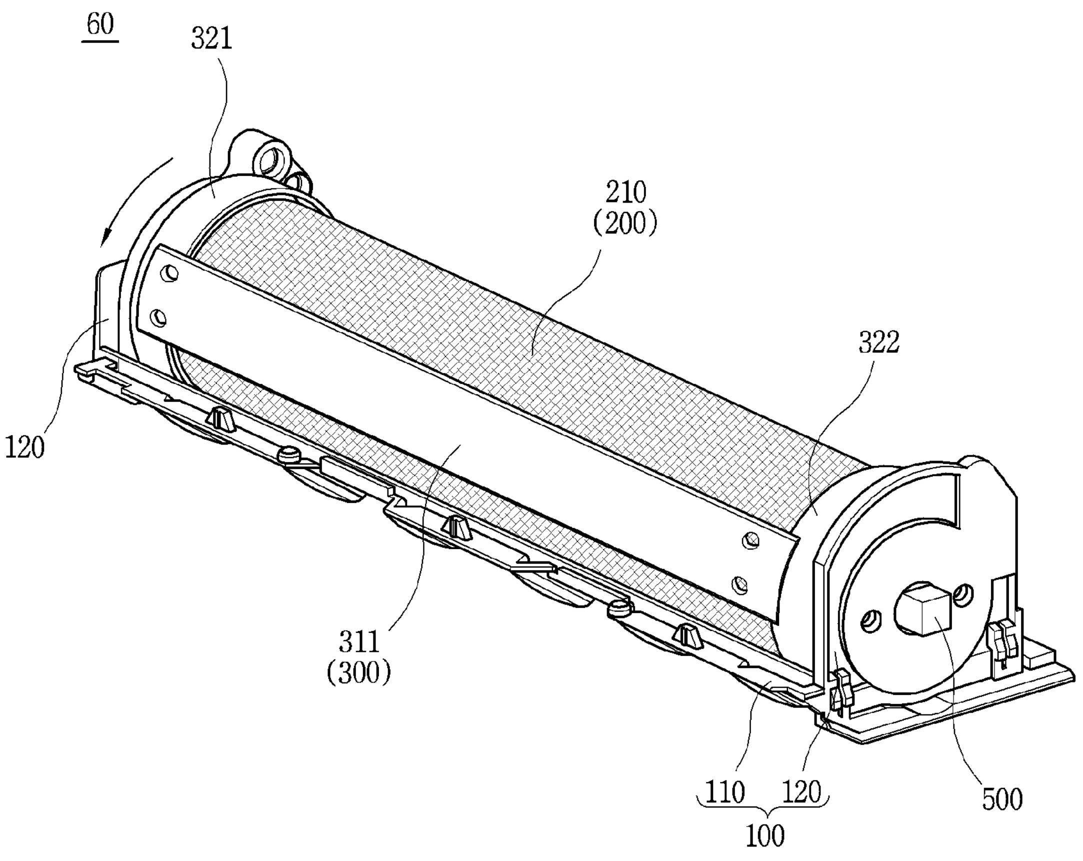

Referring to FIG. 11, an embodiment in which the power part 500 is rotated in a counterclockwise direction is illustrated. In the above embodiment, the power part 500, the main gear 410, the second sub-gear 422, and the removal member 300 are also rotated in a counterclockwise direction.

At this time, a gear ratio between the main gear 410, the sub-gear 420, and the teeth part 330 is adjusted to rotate the removal member 300 faster than the brush 200.

Accordingly, trash (H) such as fur adhered to the adhesive member 210 of the brush 200 may be pressed by the removal member 300 and removed from the brush 200.

4. Description of Process in which Trash (H) Such as Fur is Collected and Separated by Nozzle Part 60 According to Embodiment of Present Disclosure and Robot Cleaner 1 Including the Same The nozzle part 60 according to an embodiment of the present disclosure and the robot cleaner 1 including same may effectively collect trash (H) such as fur staying in the driving environment.

In addition, the collected trash (H) such as fur may be easily separated and accommodated in the dust bin 30, even when the user does not perform an additional operation.

Hereinafter, with reference to FIG. 12, a process in which trash (H) such as fur is collected and separated by the nozzle part 60 according to an embodiment of the present disclosure and the robot cleaner 1 including the same will be described in detail.

Figure 12:
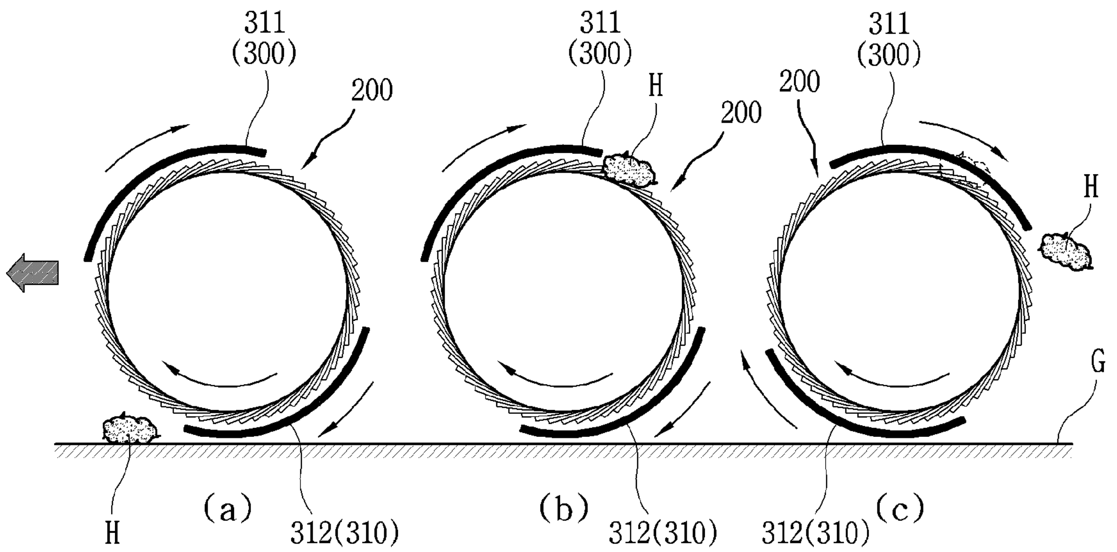
FIG. 12 is a conceptual view illustrating a process of collecting trash such as fur by a robot cleaner according to an embodiment of the present disclosure.

Referring to (a) of FIG. 12, it is illustrated that the brush 200 and the removal member 300 of the nozzle part 60 provided in the robot cleaner 1 driven on the floor surface (G) toward the left side.

Here, it will be understood that the removal member 300 is rotated according to the operation of the power part 500, but rotated at a faster speed than the brush 200 in the same direction as the brush 200.

Here, trash (H) such as fur is located on the floor surface (G) before the robot cleaner (1) passes therethrough.

Referring to (b) of FIG. 12, it is illustrated a state in which the robot cleaner 1 is driven and trash (H) such as fur existing on the floor surface (G) is collected by the brush 200.

As described above, the brush 200 includes an adhesive member 210 surrounding an outer circumference thereof. The adhesive member 210 may be formed of a fiber material having a high roughness such as felt.

As the rotation of the brush 200 continues, trash (H) such as fur adhered to the adhesive member 210 is rotated in a clockwise direction inside the frame 100, that is, in the illustrated embodiment.

Referring to (c) of FIG. 12, it is illustrated a state in which trash (H) such as fur adhered to the adhesive member 210 is removed by the removal member 300.

In other words, by the rotation of the brush 200, the trash H such as fur is moved to a downstream side in a direction in which the brush 200 is rotated. The moved trash (H) such as fur is pressed by the removal member 300 rotating at a faster speed than the brush 200 at a radial outer side of the brush 200.

Accordingly, trash (H) such as fur is removed toward a rear side of the brush 200, that is, an inner space of the nozzle housing 50.

As described above, the inner space of the nozzle housing 50 communicates with an inner space of the body part 10 and the dust bin 30 through the communication part 53.

Accordingly, the removed trash (H) such as fur is collected in the dust bin 30 through the communication part 53 and the inner space of the body part 10.

As a result, the nozzle part 60 according to an embodiment of the present disclosure and the robot cleaner 1 including the same may effectively collect trash (H) such as fur that is difficult to remove from the floor surface (G).

In addition, the collected trash (H) such as fur may be easily separated from the brush 200 by the removal member 300 and accommodated in the dust bin 30.

Moreover, the above process may be achieved by rotating the brush 200 and the removal member 300 at different speeds by a single number of the power part 500.

Though the present invention is described with reference to preferred embodiments, various modifications and improvements will become apparent to those skilled in the art without departing from the concept and scope of the present invention as defined in the following claims.

1: Robot cleaner
10: Body part
20: Driving part
30: Dust bin
40: Sensor part
50: Nozzle housing
51: Outer housing
52: Inner housing
53: Communication part
60: Nozzle part
100: Frame
110: Lower frame
120: Side frame
130: Support frame
200: Brush
210: Adhesive member
300: Removal member
310: Extension part
311: First extension part
312: Second extension part
320: Support part
321: First support part
322: Second support part
330: Teeth part
400: Gear part
410: Main gear
411: First main gear
412: Second main gear
420: Sub-gear
421: First sub-gear
422: Second sub-gear
500: Power part
H: Trash such as fur
G: Floor surface

The invention claimed is:

1. A nozzle assembly, comprising:
a frame;
a roller rotatably coupled to the frame to extend in an extension direction; and
a removal assembly located adjacent to the roller, and rotatably coupled to the frame with respect to the roller,
wherein the removal assembly comprises:
an extension wall extending along the extension direction of the roller, and located adjacent to an outer circumference of the roller to partially cover the outer circumference of the roller; and
a support part located at an end of the extension wall, and rotatably coupled to the frame
wherein the support part defines a hollow, and the roller passes therethrough, and an inner circumference of the support frame surrounding the hollow has a circular cross section,
wherein the nozzle assembly further comprises:
a main gear coupled to the roller to rotate together with the roller; and
a sub-gear coupled to the main gear, and
wherein the removal assembly further comprises:
teeth positioned on the inner circumference of the support part and coupled to the sub-gear.

2. The nozzle assembly of claim 1, wherein the roller and the removal assembly are rotated in a same direction, and the removal assembly is rotated at a different speed than the roller.

3. The nozzle assembly of claim 1, wherein the removal assembly revolves with respect to the roller at a radial outer side of the roller about a rotational axis of the roller.

4. The nozzle assembly of claim 3, wherein the extension wall has a cross section with an arc shape having a curvature centered on the rotational axis of the roller, and the curvature matches a curvature of the outer circumference of the roller.

5. The nozzle assembly of claim 1, wherein the removal assembly includes a plurality of the extension walls, and the plurality of extension walls are positioned to be spaced apart from each other in a circumferential direction of the roller at a radial outer side of the roller.

6. The nozzle assembly of claim 5, wherein a pair of the plurality of the extension wall are positioned such that the roller is interposed therebetween.

7. The nozzle assembly of claim 1, wherein the extension wall has a width in a circumferential direction different of the roller, and the width of the extension wall is less than a fourth of a length of the outer circumference of the roller.

8. The nozzle assembly of claim 1, wherein the inner circumference of the support frame surrounding the hollow is spaced apart from the outer circumference of the roller.

9. The nozzle assembly of claim 1, wherein the sub-gear comprises:

a first sub-gear coupled to the main gear; and a second sub-gear located between the first sub-gear and the teeth part, and coupled to the first sub-gear and the teeth on the inner circumference of the support part, respectively.

10. A robot cleaner, comprising:

a body;

a dust bin detachably coupled to the body, and having a space defined therein;

a nozzle housing detachably coupled to the body, an inner space of which communicates with the space of the dust bin; and a nozzle assembly accommodated in the nozzle housing, wherein the nozzle assembly comprises:

a frame coupled to the nozzle housing;

a roller rotatably coupled to the frame, having a circular cross section, extending in an extension direction, and partially exposed to an outside through an opening of the nozzle housing; and a removal assembly located adjacent to the roller to extend in the extension direction of the roller, and rotatably coupled to the frame with respect to the roller at a radial outer side of the roller, wherein the removal assembly comprises:

an extension wall extending along the extension direction of the roller, and located adjacent to an outer circumference of the roller to cover a portion of the outer circumference of the roller; and a support part located at an end of the extension wall, and rotatably coupled to the frame, and wherein:

the support part defines a hollow along the extension direction of the roller, the roller passing therethrough, teeth are provided on an inner circumference of the support part surrounding the hollow, and the removal assembly comprises a gear train coupled to the roller, and coupled to the teeth of the inner circumference of the support part.

11. The robot cleaner of claim 10, wherein;

a cross section of the extension wall has an arc shape centered at a rotational axis of the roller, having an inner surface defined with a same curvature as the outer circumference of the roller, and having a central angle of an acute angle, and the nozzle assembly includes a plurality of the extension walls, and the plurality of extension walls are spaced apart from each other in a circumferential direction of the roller at a radial outer side of the roller.

12. The robot cleaner of claim 10, wherein the gear train comprises:

a main gear coupled to the roller to rotate together with the roller;

a first sub-gear coupled to the main gear; and a second sub-gear located between the first sub-gear and the teeth of the inner circumference of the support part, and coupled to the first sub-gear and the teeth of the inner circumference of the support part, respectively, and wherein the main gear, the second sub-gear, and the removal assembly are rotated in a same direction.

* * * * *